United States Patent
Oishi (10) Patent No.: US 7,509,196 B2
(45) Date of Patent: Mar. 24, 2009

(54) AIRBAG DEVELOPMENT CONTROL APPARATUS

(75) Inventor: Mineyuki Oishi, Tokyo (JP)

(73) Assignee: Calsonic Kansei Corporation, Tokyo (JP)

(*) Notice: Subject to any disclaimer, the term of this patent is extended or adjusted under 35 U.S.C. 154(b) by 187 days.

(21) Appl. No.: 11/250,608

(22) Filed: Oct. 17, 2005

(65) Prior Publication Data
US 2006/0095185 A1    May 4, 2006

(30) Foreign Application Priority Data
Nov. 2, 2004    (JP)    ............... 2004-318902

(51) Int. Cl.
*B60R 22/00*    (2006.01)
(52) U.S. Cl. .......... 701/45; 701/46; 280/731; 280/735; 280/736; 280/741; 280/742; 180/271; 180/282
(58) Field of Classification Search .......... 701/45, 701/46; 280/735, 736, 731, 741, 742; 180/282, 180/271
See application file for complete search history.

(56) References Cited

U.S. PATENT DOCUMENTS

| | | | | |
|---|---|---|---|---|
| 5,504,379 A | * | 4/1996 | Mazur et al. ........... | 307/10.1 |
| 5,702,124 A | * | 12/1997 | Foo et al. .............. | 280/735 |
| 5,871,231 A | * | 2/1999 | Richards et al. ........ | 280/735 |
| 5,899,948 A | * | 5/1999 | Raphael et al. ......... | 701/45 |
| 5,964,817 A | * | 10/1999 | Dalum et al. ........... | 701/45 |
| 5,999,871 A | * | 12/1999 | Liu .................... | 701/45 |
| 6,018,980 A | * | 2/2000 | Kimura et al. .......... | 73/12.04 |
| 6,068,288 A | * | 5/2000 | Karolek et al. ......... | 280/735 |
| 6,199,903 B1 | * | 3/2001 | Brambilla et al. ...... | 280/735 |
| 6,219,606 B1 | * | 4/2001 | Wessels et al. ......... | 701/45 |
| 6,236,921 B1 | * | 5/2001 | McConnell ............. | 701/45 |
| 6,246,937 B1 | * | 6/2001 | Miyaguchi et al. ...... | 701/45 |
| 6,459,975 B1 | * | 10/2002 | Kuhn et al. ............ | 701/45 |
| 6,491,321 B1 | * | 12/2002 | Nakashima et al. ..... | 280/736 |
| 6,496,764 B1 | * | 12/2002 | Wang .................. | 701/45 |
| 6,512,969 B1 | * | 1/2003 | Wang .................. | 701/45 |
| 6,598,901 B2 | * | 7/2003 | Nakashima et al. ..... | 280/736 |

(Continued)

FOREIGN PATENT DOCUMENTS

JP     10-029494 A    2/1998

(Continued)

*Primary Examiner*—Thomas G Black
*Assistant Examiner*—Wae Louie
(74) *Attorney, Agent, or Firm*—Foley & Lardner LLP (57) ABSTRACT

An anterior part of a vehicle is provided with a bumper armature as a structural member having high rigidity. A bumper is disposed front of the bumper armature, and a radiator and an engine are disposed behind the bumper armature. A collision determining device embedded with an acceleration sensor as an airbag development control apparatus is arranged in a position approximately in the center of a vehicle interior. A time period "t" during when a signal waveform curve outputted from the acceleration sensor reaches from a first threshold value to a second threshold value is measured to judge whether or not the time period "t" is equal to or less than a previously set time "s". When $t \leq s$ satisfied, full development of an airbag in which both of inflators are activated is selected by determining that the collision is occurred under a high speed condition. When $t > s$ is satisfied, depowered development of the airbag in which one of the inflators is activated is selected by determining that the collision is occurred under a non-high speed condition.

6 Claims, 5 Drawing Sheets

U.S. PATENT DOCUMENTS

| | | | |
|---|---|---|---|
| 6,722,694 B1 * | 4/2004 | Nakashima et al. | 280/736 |
| 6,742,807 B2 * | 6/2004 | Muller et al. | 280/735 |
| 6,748,307 B1 * | 6/2004 | Sala et al. | 701/46 |
| 6,816,766 B2 * | 11/2004 | Sala et al. | 701/45 |
| 6,945,561 B2 * | 9/2005 | Nakashima et al. | 280/736 |
| 7,152,874 B2 * | 12/2006 | Nakashima et al. | 280/735 |
| 7,349,783 B2 * | 3/2008 | Cashler et al. | 701/45 |
| 2003/0010247 A1 * | 1/2003 | Miyaji et al. | 102/530 |
| 2005/0278098 A1 * | 12/2005 | Breed | 701/45 |
| 2006/0095185 A1 * | 5/2006 | Oishi | 701/45 |
| 2008/0100046 A1 * | 5/2008 | Hayakawa et al. | 280/735 |

FOREIGN PATENT DOCUMENTS

JP    2001-010441 A    1/2001

* cited by examiner

AIRBAG DEVELOPMENT CONTROL APPARATUS

BACKGROUND

The present invention relates to an airbag development control apparatus which develops an airbag by detecting a collision of a vehicle.

Figure 5:
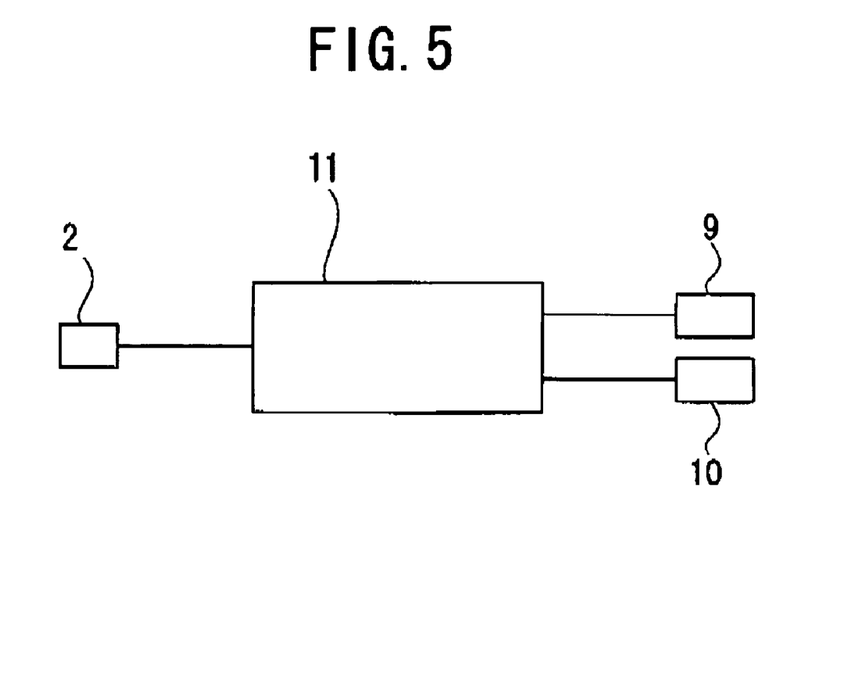
FIG. 5 is a block diagram showing one example of a conventional airbag development control apparatus.

Such an airbag development control apparatus shown in FIG. 5 has been generally known.

The conventional airbag development control apparatus shown in FIG. 5 includes an acceleration sensor (G-sensor) 2, an electronic control unit 11 and inflators 9 and 10. An airbag which is not shown is configured to be developed by the above-mentioned two inflators 9 and 10.

In the conventional airbag development control apparatus, when a vehicle collides, acceleration at the time of collision is detected by the acceleration sensor 2, and detection signals of the acceleration outputted from the acceleration sensor 2 are subjected to arithmetic processing such as integration by the electronic control unit 11 to calculate a collision speed. When the collision speed is less than a first threshold value, neither the inflator 9 nor the inflator 10 is operated. When the collision speed is more than the first threshold value but less than a second threshold value, only the inflator 9 is operated to partially develop the not-shown airbag, whereas when the collision speed is more than the first threshold value and the second threshold value, the inflator 10 is operated after the inflator 9 is operated to fully develop the not-shown airbag.

Figure 6:
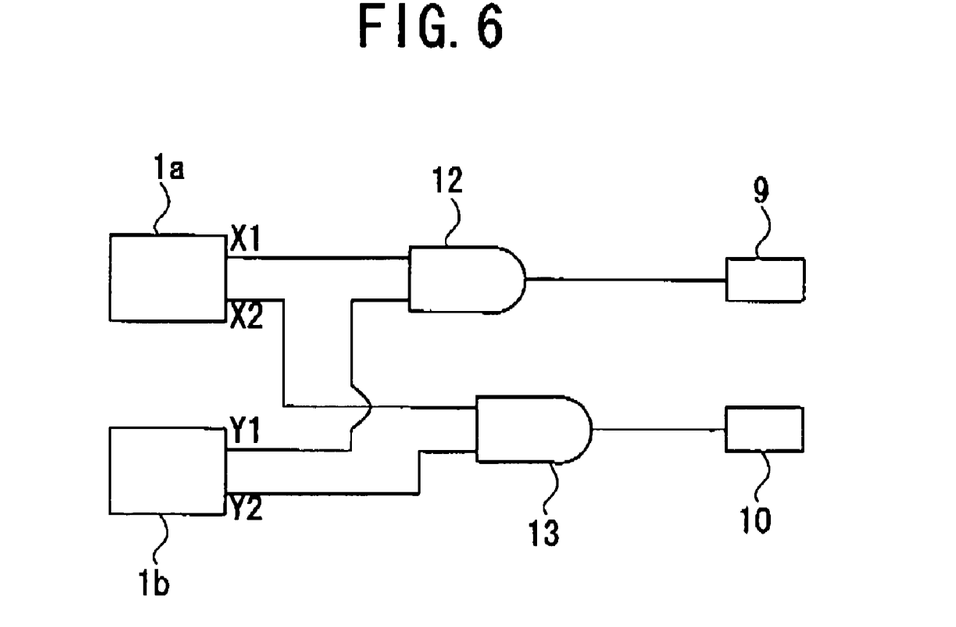
FIG. 6 is a block diagram showing another example of the conventional airbag development control apparatus.

In addition, another airbag development control apparatus shown in FIG. 6 has also been known.

The airbag development control apparatus shown in FIG. 6 includes an initial collision detecting unit 1a disposed at an anterior end of a vehicle, a collision determining unit 1b disposed in the center of the vehicle (in the vicinity of a shift gear), AND gates 12, 13 and inflators 9, 10. Each of the initial collision detecting unit 1a and the collision determining unit 1b is embedded with an acceleration sensor.

In the conventional airbag development control apparatus of FIG. 6, the initial collision detecting unit 1a detects acceleration signals generated in the initial stage of collision to output first collision determination signals X1 and also detects acceleration signals generated in the stage posterior to the initial stage of the collision to output second collision determination signals X2. The collision determining unit 1b detects acceleration signals of a level in the initial stage of the collision to output third collision determination signals Y1, and also detects acceleration signals generated in the stage posterior to the initial stage to output fourth collision determination signals Y2. Wherein, the inflator 9 is operated to partially develop a not-shown airbag by utilizing signals which are based on an AND operation of the first collision determination signals X1 and the third collision determination signals Y1, and the inflator 10 is operated to fully develop the not-shown airbag by utilizing signals based on an AND operation of the second collision determination signals X2 and the fourth collision determination signals Y2.

Here, it is to be noted that each of the above-described first to fourth collision determination signals X1, X2, Y1 and Y2 are generated based on signals in which the acceleration signals are processed with integration processing.

In development control of the airbag, judgment on the development of the airbag is performed by algorism such that an event of collision is detected and the airbag is developed at the most appropriate timing. Each of the conventional airbag development control apparatuses described above performs the integration arithmetic of the signals detected by the acceleration sensor and utilizes a result of the integration arithmetic as the judgment on the development of the airbag, in accordance with collision detecting algorism.

However, in the judgment on the development of the airbag utilizing the algorism, an integration value does not make a significant difference in a value immediately after the collision depending upon a structure of vehicle or a mode of collision, so that it is difficult to appropriately differentiate and satisfy following requirements which are to be stipulated in the North American regulation in the future.

1. Performing depowered development of the airbag when the vehicle collides head-on at 26 kph.

2. Performing full development of the airbag at 64 kph according to ODB (Offset Deformable Barrier) collision.

3. Performing full development of the airbag when the vehicle collides at an angle at 48 kph.

In addition, it is necessary to make decision on the judgment of the development approximately 30 milliseconds (0.03 second) before the acceleration which causes damage to an occupant is generated, in anticipation of the time required for the airbag to expand. However, the judgment of the development is delayed when intensity of the collision is judged at the time when the difference in the integration value is occurred.

Figure 7:
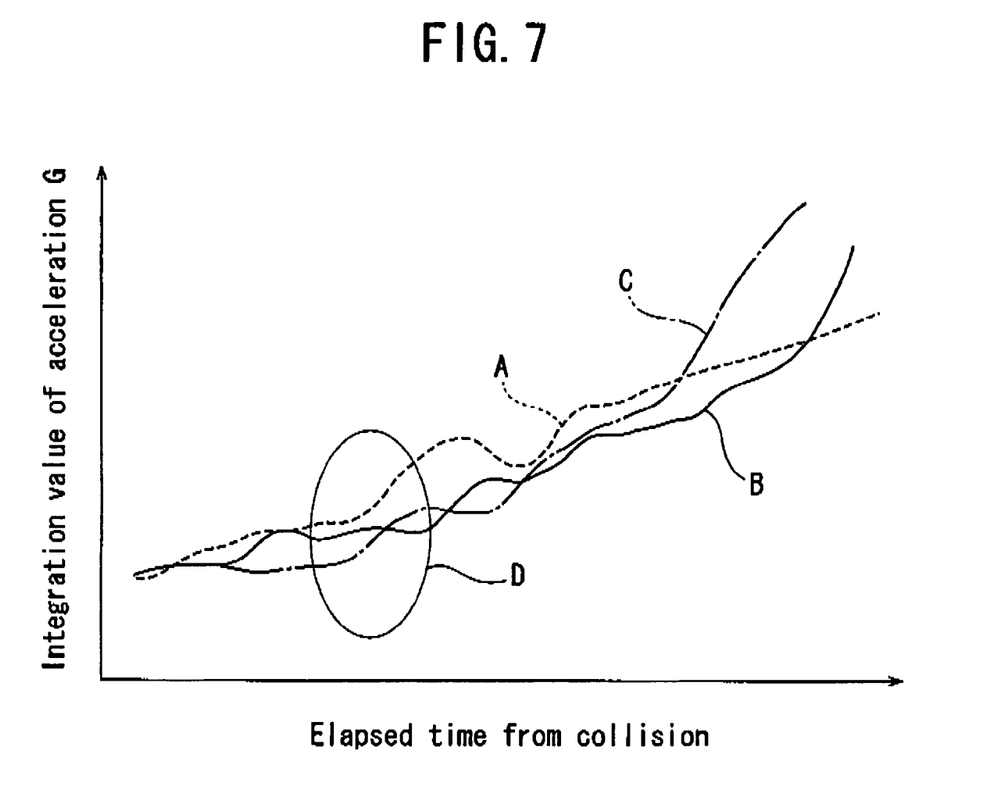
FIG. 7 is a graph of curves each representing an integration value of acceleration signals.

FIG. 7 shows curves each representing an integration value of acceleration signals detected by an acceleration sensor disposed in the center of a vehicle. Wherein, a curve A represents a case when the vehicle is collided head-on at 26 kph, a curve B represents a case when the vehicle is collided at 64 kph according to the ODB collision, and a curve C represents a case when the vehicle is collided at an angle at 48 kph.

As is apparent from FIG. 7, there is virtually no difference in the integration values represented by the curves A to C in the vicinity of 30 milliseconds after occurrence of the collision (inside of a circle indicated by "D" in the drawing). Hence, differentiation of the mode of collision is difficult.

Also, the above-described conventional airbag development control apparatus shown in FIG. 6 provides the acceleration sensor in each of the initial collision detecting unit 1a disposed at the anterior end of the vehicle and the collision determining unit 1b disposed in the center of the vehicle to carry out the development control of the airbag by utilizing the mutually different acceleration signals which are generated by the two acceleration sensors. Accordingly, there is also a problem in the conventional airbag development control apparatus that a circuit for signal processing becomes complicated, resulting in increased cost.

SUMMARY

Therefore, the present invention has been made in view of the above circumstances, and at least one objective of the present invention is to provide an airbag development control apparatus capable of differentiating a degree of acceleration generated at the initial stage of collision to judge a difference of modes of collision so as to perform appropriate development control of an airbag, and of performing such development control by a single acceleration sensor.

To achieve these and other advantages and in accordance with the purpose of the invention, as embodied and broadly described herein, the invention provides an airbag development control apparatus. The airbag development control apparatus for a vehicle comprises: an acceleration signal generator for generating acceleration signals on collision of the vehicle; a threshold value setter for setting a first threshold value and a second threshold value for the acceleration signals generated by the acceleration signal generator, the second threshold value is larger than the first threshold value; a timer for measuring a time period during when the acceleration signals, generated at an initial stage of the collision by the acceleration signal generator reach the second threshold value from the first threshold value; and a judgment circuit for selectively deciding a mode of development of an airbag according to a result of the measurement of the time period by the timer.

Following are preferred embodiments (1) to (3) of the airbag development control apparatus according to the present invention. Any combinations thereof are considered to be preferred ones of the present invention unless any contradictions occur.

(1) When the acceleration signals exceed the first threshold value and then once fell below the first threshold value without reaching the second threshold value and thereafter reached the first threshold value again, the timer measures the time period based on a point of time that the acceleration signals have initially exceeded the first threshold value without taking a point of time that the acceleration signals have exceeded the first threshold value again as a basis of the measurement of the time period.

(2) The airbag development control apparatus further comprises a plurality of inflators coupled with the judgment circuit for inflating the airbag, wherein the judgment circuit activates all of the inflators to fully develop the airbag when the measured time period by the timer is equal to or less than previously set time, and activates one of the inflators to partially develop the airbag when the measured time period by the timer exceeds the previously set time.

(3) The vehicle comprises a structural member having high rigidity provided at front of the vehicle and extended in a vehicle-width direction.

In addition, present invention provides an airbag development control method. The method for controlling development of an airbag of a vehicle comprises: generating acceleration signals on collision of the vehicle; setting a first threshold value and a second threshold value for the acceleration signals, the second threshold value is larger than the first threshold value; measuring a time period during when the acceleration signals generated at an initial stage of the collision reach the second threshold value from the first threshold value; and deciding a mode of the development of the airbag according to a result of the measurement of the time period.

Following are preferred embodiments (1) to (3) of the airbag development control method according to the present invention. Any combinations thereof are considered to be preferred ones of the present invention unless any contradictions occur.

(1) The method comprises measuring the time period based on a point of time that the acceleration signals have initially exceeded the first threshold value when the acceleration signals exceed the first threshold value and then once fell below the first threshold value without reaching the second threshold value and thereafter reached the first threshold value again, without taking a point of time that the acceleration signals have exceeded the first threshold value again as a basis of the measurement of the time period.

(2) The method comprises: fully developing the airbag when the measured time period is equal to or less than previously set time; and partially developing the airbag when the measured time period exceeds the previously set time.

(3) The vehicle comprises a structural member having high rigidity provided at front of the vehicle and extended in a vehicle-width direction.

It is to be understood that both the foregoing general description and the following detailed description are exemplary, and are intended to provide further explanation of the invention as claimed.

The present application is based on and claims priority from Japanese application number 2004-318902, filed Nov. 2, 2004, the disclosure of which is hereby incorporated by reference herein in its entirety.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. The scope of the present invention, however, is not limited to these embodiments. Within the scope of the present invention, any structure and material described below can be appropriately modified.

Wherever possible, the same reference numbers are used in the drawings and the description to refer to the same or like parts of the above-described conventional examples.

Figure 1:
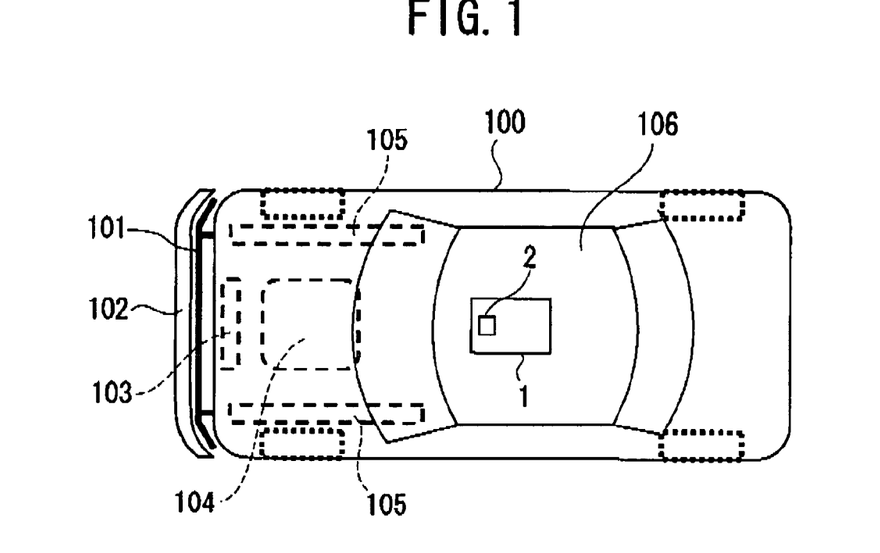
FIG. 1 is a schematic plan view illustrating an airbag development control apparatus installed in a vehicle according to an embodiment of the present invention.

FIG. 1 is a schematic plan view illustrating an airbag development control apparatus according to the present invention installed in a vehicle 100. Referring to FIG. 1, an anterior part of the vehicle 100 is provided with a bumper armature 101 as a structural member having high rigidity. A bumper 102 is disposed front of the bumper armature 101, and a radiator 103 and an engine 104 are disposed behind the bumper armature 101.

A pair of side members 105 extending in a longitudinal direction of the vehicle 100 is disposed at both sides of the engine 104. Front ends of the side members 105 extend near to the bumper armature 101 whereas back ends of the side members 105 are coupled to front pillars (not shown) forming a vehicle interior 106.

In one embodiment, the front ends of the side members 105 are directly coupled to the bumper armature, A collision determining device 1 embedded with an acceleration sensor 2 as an airbag development control apparatus is arranged in a position approximately in the center of the vehicle interior 106 relative to an anteroposterior direction and a vehicle-width direction of the vehicle interior 106.

Figure 2:
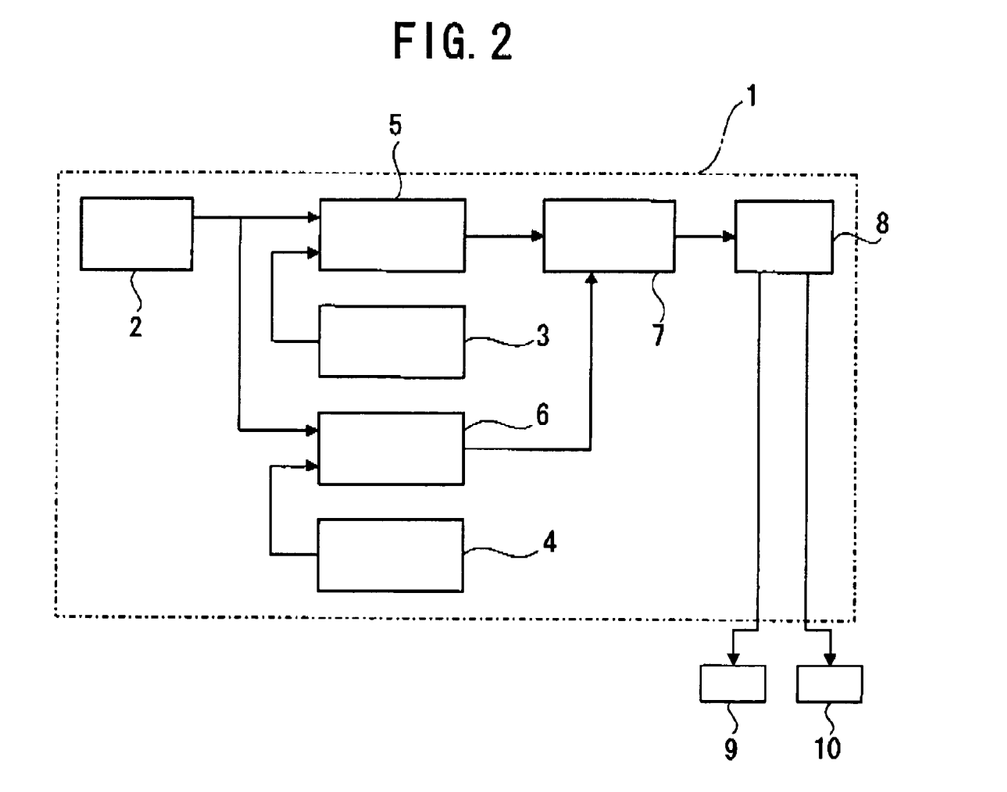
FIG. 2 is a schematic block diagram representing a collision determining device as the airbag development control apparatus according to the embodiment of the present invention.

Referring to FIG. 2, the collision determining device 1 comprises the acceleration sensor 2 for generating acceleration signals when the vehicle 100 collides, a first threshold value transmission circuit 3 for storing a first threshold value and sending out the first threshold value, and a second threshold value transmission circuit 4 for storing a second threshold value and sending out the second threshold value.

The collision determining device 1 also comprises a first threshold value comparison circuit 5 for comparing the acceleration signals outputted from the acceleration sensor 2 with the first threshold value sent out from the first threshold value transmission circuit 3 and outputting first threshold value reaching signals when the acceleration signals have reached the first threshold value, and a second threshold value comparison circuit 6 for comparing the acceleration signals outputted from the acceleration sensor 2 with the second threshold value sent out from the second threshold value transmission circuit 4 and outputting second threshold value reaching signals when the acceleration signals have reached the second threshold value.

The first threshold value transmission circuit 3, the first threshold value comparison circuit 5, the second threshold value transmission circuit 4 and the second threshold value comparison circuit 6 structure a threshold value setter.

Moreover, the collision determining device 1 comprises a time measurement circuit 7 for measuring a time period "t" from a point in which the acceleration signals have reached the first threshold value until a point in which the acceleration signals reach the second threshold value based on the first and second threshold value reaching signals outputted from the first and the second threshold value comparison circuits 5 and 6, respectively, and a judgment circuit 8 for deciding a mode of development of a not-shown airbag according to a result of measurement of the time period "t" by the time measurement circuit 7. Inflators 9 and 10 for inflating and developing the not-shown airbag are operated by an output from the judgment circuit 8.

Now, operation of the airbag development control apparatus according to the present embodiment will be described with reference to FIGS. 3 and 4.

Figure 3:
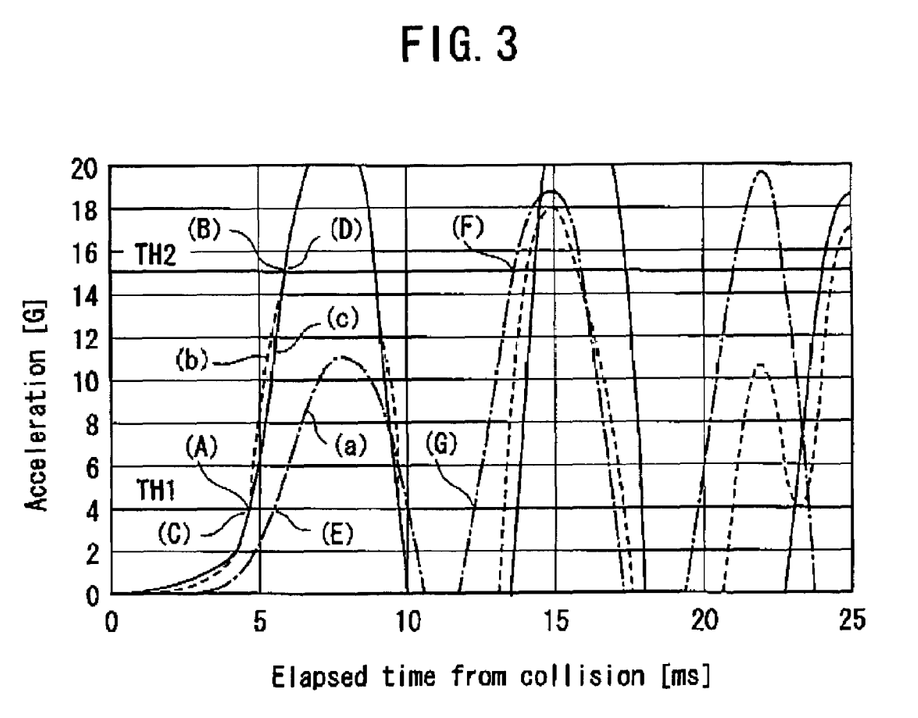
FIG. 3 is a graph representing each signal waveform outputted from an acceleration sensor according to the embodiment of the present invention.

A signal waveform outputted from the acceleration sensor 2 when the vehicle 100 collides is as shown in FIG. 3. Wherein, a signal waveform when the vehicle 100 collides head-on at 26 kph is represented by a dashed-line curve (a), a signal waveform when the vehicle 100 collides at an angle at 48 kph is represented by a dotted-line curve (b), and a signal waveform when the vehicle 100 collides according to the ODB collision at 64 kph is represented by a solid-line curve (c).

In addition, "TH1" shown in FIG. 3 represents the first threshold value which is set at, for example but not limited to, 4 G of acceleration and stored in the first threshold value transmission circuit 3. "TH2" represents the second threshold value set at, for example but not limited to, 15 G of the acceleration and stored in the second threshold value transmission circuit 4.

In a case that the vehicle 100 collides according to the ODB collision at 64 kph, the first threshold value reaching signals are outputted from the first threshold value comparison circuit 5 when the acceleration signals represented by the signal waveform curve (c) reach the first threshold value TH1, and then the second threshold value reaching signals are outputted from the second threshold value comparison circuit 6 when the signal waveform curve (c) reaches the second threshold value TH2. The time measurement circuit 7 measures a time difference in generation of the first threshold value reaching signals and the second threshold value reaching signals, and thereby the time period "t" (t1 in the case of ODB collision) from an intersection point (A) of the signal waveform curve (c) and the first threshold value TH1 to an intersection point (B) of the signal waveform (c) and the second threshold value TH2 is outputted from the time measurement circuit 7.

Then, the judgment circuit 8 judges whether or not the time period "t" (t1) is equal to or less than previously set time "s" (for example but not limited to, 2.5 ms). When t1≦s is satisfied, the judgment circuit 8 judges the collision as the ODB collision at 64 kph (i.e. a gradient of acceleration shown by the curve (c) is sharp), and thus selects full development of the airbag in which both of the inflators 9 and 10 are activated. On the other hand, when t1>s is satisfied, the judgment circuit 8 judges that the collision is not the ODB collision at 64 kph (i.e. the gradient of acceleration of the curve (c) is moderate), and thus selects depowered development of the airbag in which one of the inflators 9 and 10 is activated.

Such signal processing of the collision determining device 1 is carried out in the initial stage of the collision. The initial stage, more specifically, is a stage until when the bumper armature 101 collapses by the collision and the side members 105 start to deform, for example.

Similarly, in a case that the vehicle 100 collides at an angle at 48 kph, the time period "t" (t2 in the case of the angled collision at 48 kph) from an intersection point (C) of the signal waveform curve (b) and the first threshold value TH1 to an intersection point (D) of the signal waveform (b) and the second threshold value TH2 is measured by the time measurement circuit 7.

The judgment circuit 8 judges whether or not the time period "t" (t2) is equal to or less than the previously set time "s" (for example but not limited to, 2.5 ms). When t2≦s, the judgment circuit 8 judges the collision as the angled collision at 48 kph (i.e. a gradient of acceleration shown by the curve (b) is sharp), and thus selects and operates both of the inflators 9 and 10 to fully develop the airbag, whereas when t2>s is satisfied, the judgment circuit 8 judges that the collision is not the angled collision at 48 kph (i.e. the gradient of acceleration of the curve (b) is moderate), and thus selects and operates one of the inflators 9 and 10 to partially develop the airbag as the depowered development of the airbag.

In addition, in a case that the vehicle 100 collides head-on at 26 kph, the time period "t" (t3 in the case of the head-on collision at 26 kph) from an intersection point (E) of the signal waveform curve (a) and the first threshold value TH1 to an intersection point (F) of the signal waveform (a) and the second threshold value TH2 is measured by the time measurement circuit 7.

The judgment circuit 8 judges whether or not the time period "t" (t3) is equal to or less than the previously set time "s" (for example but not limited to, 2.5 ms). When t3≦s, the judgment circuit 8 judges that the collision is not the head-on collision at 26 kph (i.e. a gradient of acceleration shown by the curve (a) is sharp), and thus selects to operate both of the inflators 9 and 10 to fully develop the airbag.

When t3>s is satisfied, the judgment circuit 8 judges that the collision is the head-on collision at 26 kph (i.e. the gradient of acceleration of the curve (a) is moderate), and thus selects to operate one of the inflators 9 and 10 to perform the depowered development of the airbag.

In a case when the acceleration signals have exceeded the first threshold value TH1 but thereafter, fell below the first threshold value TH1 without reaching the second threshold value TH2 as in the signal waveform curve (a) at the 26 kph head-on collision shown in FIG. 3, the intersection point (G)

of the re-ascended acceleration signals and the first threshold value TH1 is ignored so as not to start the measurement of time period "t" from the intersection point (G). In the present case, the measurement of time period "t" until when the acceleration signals reach the intersection point (F) is carried out on the basis of the initial intersection point (E) intersected with the first threshold value.

It is to be noted that, in FIG. 3, the initial shape of wave in the 64 kph ODB collision and the initial shape of wave in the 48 kph angled collision are almost the same with each other, so that the intersection points (A) and (C), and also the intersection points (B) and (D) are situated in an overlapped state.

Figure 4:
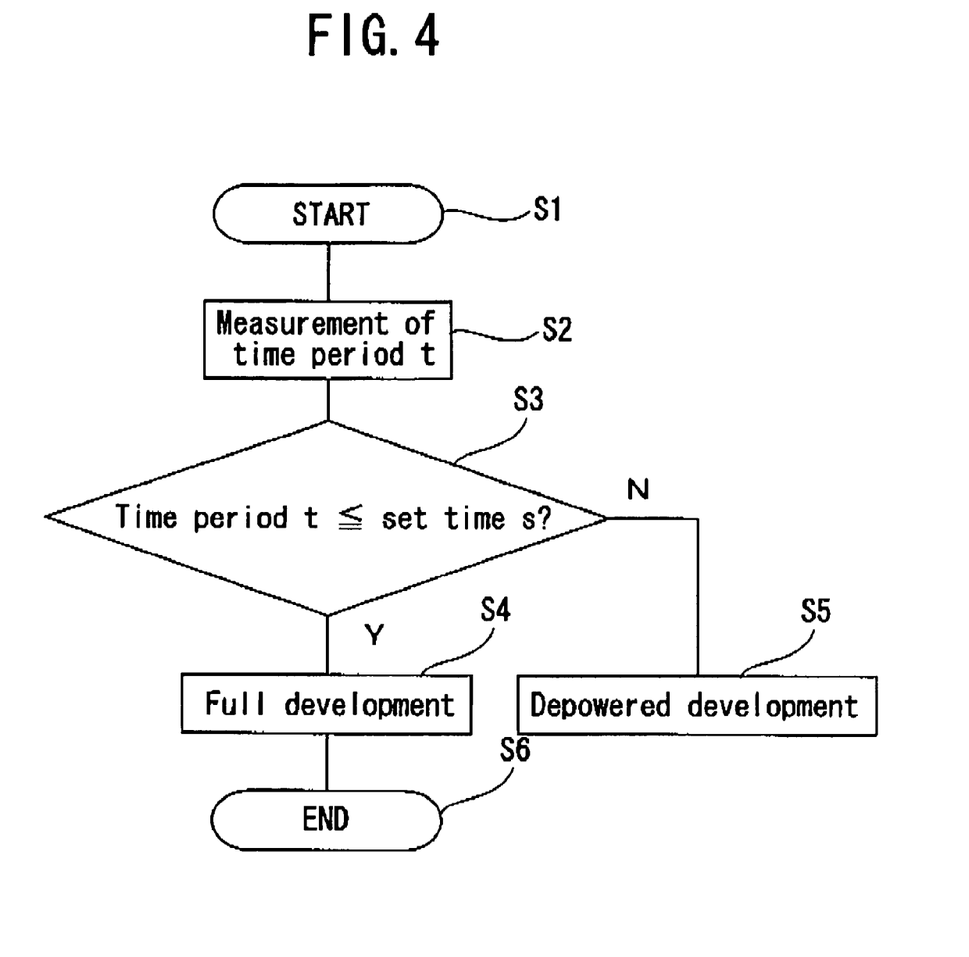
FIG. 4 is a flowchart of signal processing according to the embodiment of the present invention.

FIG. 4 is a flowchart showing a flow of the signal processing described above. In step S2, the time period "t" that the signal waveform curve (acceleration signals) reaches from the first threshold value TH1 to the second threshold value TH2 is measured. Then, in step S3, whether or not the time period "t" is equal to or less than the previously set time "s" (for example but not limited to, 2.5 ms) is judged. Then, when $t \leq s$ is satisfied, the full development of the airbag in which both of the inflators are activated is selected in step S4 by determining that the collision is occurred under a high speed condition (i.e. a gradient of acceleration is sharp). On the other hand, when t>s is satisfied, the depowered development of the airbag in which one of the inflators is activated is selected in step S5 by determining that the collision is occurred under a non-high speed condition (i.e. the gradient of acceleration is moderate).

Although the invention has been described in its preferred form with a certain degree of particularity, it should be noted that the present invention is not limited by the embodiments described in the foregoing.

For example, although the vehicle is provided with the bumper armature as the structural member in the above-described embodiment, a structural member having high rigidity and which extends in the vehicle-width direction may be provided in front of the vehicle.

In addition, although the differentiation of modes of collision among 26 kph head-on collision, 64 kph ODB collision and 48 kph angled collision has been described in the present embodiment, it is also possible to apply the present invention to differentiation of modes of collision which is difficult to be differentiated by a value in which acceleration signals are calculated based on integration.

Accordingly, the airbag development control apparatus of the present invention at least has the following advantages:

1. It is possible to differentiate a degree of acceleration generated at the initial stage of collision to judge the difference of modes of collision such as 26 kph head-on collision, 64 kph ODB collision and 48 kph angled collision, which is difficult to differentiate if an integral value of the acceleration signal is used.

2. The structural member having high rigidity is attached at front of the vehicle and the structural member extends in the vehicle-width direction, and the time period "t" during when the acceleration signals generated at the initial stage of the collision reach the second threshold value from the first threshold value is measured to selectively decide the mode of development of the airbag based on the time period "t". Because the structural member having high rigidity extends substantially in the overall width of the vehicle, a difference in areas of collision due to variation of the modes of collision can be eliminated. Therefore, the acceleration signals generated at the time of collision relative to the structural member having high rigidity can be regarded as a difference in a speed of the collision irrespective of the mode of collision.

Accordingly, it is further possible to differentiate the degree of acceleration generated at the initial stage of collision, and further to judge the difference of modes of collision such as 26 kph head-on collision, 64 kph ODB collision and 48 kph angled collision, which is difficult to differentiate by the use of the integral value of the acceleration signal.

3. The judgment of difference in the mode of collision can be performed by a single acceleration sensor. Therefore, it is possible to reduce costs of the airbag development control apparatus.

4. When the signal waveform of the acceleration has fallen below the first threshold value after exceeding the first threshold value before reaching the second threshold value, the measurement of the time period "t" is performed based on initial time that the signal waveform of the acceleration has exceeded the first threshold value, and time that the signal waveform of the acceleration has passed the first threshold value in a case when the signal waveform of the acceleration has risen again is considered not to be the basis of the measurement.

Therefore, it is possible to perform judgment on the development of the airbag appropriately even to a collision in which fluctuation in the signal waveform of the acceleration in the initial stage of collision is small.

Although the present invention has been described in terms of exemplary embodiments, it is not limited thereto. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An airbag development control apparatus for a vehicle, comprising:

an acceleration sensor which generates an acceleration signal on collision of the vehicle;

a plurality of differing signal waveform curves outputted from the acceleration sensor for each differing collision mode;

a threshold value setter which sets a first threshold value and a second threshold value for the acceleration signal generated by the acceleration sensor, the second threshold value being larger than the first threshold value;

a time measurement circuit which measures a time period from a point of time in which the acceleration signal, generated at an initial stage of the collision by the acceleration sensor, has reached the first threshold value to a point of time in which the acceleration signal, having reached the first threshold value, reaches the second threshold value; and a judgment circuit which compares preliminarily the time period measured by the time measurement circuit with a previously set time before the actual deployment of an airbag, capable of differentiating a degree of acceleration generated at the initial stage of collision to judge a difference of modes of collision, which activates a plurality of inflators to fully develop the airbag when the measured time period by the timer is equal to or less than the previously set time according to the comparison, and which activates one of the inflators to partially develop the airbag when the measured time period by the timer exceeds the previously set time according to the comparison; and a structural member having high rigidity spread across the approximate whole width of the vehicle width capable of extinguishing the difference in collision area due to a difference in collision modes so that acceleration speed generated during collision to the structural member having high rigidity can be viewed as a difference in collision speed regardless of the state of collision.

2. The airbag development control apparatus according to claim 1, wherein, when the acceleration signal has exceeded the first threshold value and then once fell below the first threshold value without reaching the second threshold value, measurement is performed by setting an initial time period surpassing the first threshold value as standard, without setting a time period passing through the first threshold value during re-ascending as measurement standard.

3. A method for controlling development of an airbag of a vehicle, the method comprising:

generating an acceleration signal with an acceleration sensor on collision of the vehicle;

sampling a plurality of differing signal waveform curves outputted from the acceleration sensor for each differing collision mode;

setting a first threshold value and a second threshold value for the acceleration signal generated by the acceleration sensor, the second threshold value being larger than the first threshold value;

measuring a time period from a point of time in which the acceleration signal, generated at an initial stage of the collision has reached the first threshold value to a point of time in which the acceleration signal, having reached the first threshold value, reaches the second threshold value; and comparing preliminarily the measured time period with a previously set time before the actual deployment of an airbag;

fully developing an airbag when the measured time period is equal to or less than the previously set time according to the comparison; and partially developing the airbag when the measured time period exceeds the previously set time according to the comparison; and setting a structural member having high rigidity spread across the approximate whole width of the vehicle width capable of extinguishing the difference in collision area due to a difference in collision modes so that acceleration speed generated during collision to the structural member having high rigidity can be reviewed as a difference in collision speed regardless of the state of collision.

4. The method for controlling the development of the airbag according to claim 3, the method further comprising:

when the acceleration signal has exceeded the first threshold value and then once fell below the first threshold value without reaching the second threshold value, measurement is performed by setting an initial time period surpassing the first threshold value as standard, without setting a time period passing through the first threshold value during re-ascending as measurement standard.

5. An airbag development control apparatus for a vehicle, comprising:

an acceleration sensor which generates an acceleration signal on collision of the vehicle;

a plurality of differing signal waveform curves outputted from the acceleration sensor for each differing collision mode;

a first threshold value transmission circuit which stores a first threshold value and which sends out the first threshold value;

a second threshold value transmission circuit which stores a second threshold value and which sends out the second threshold value;

a first threshold value comparison circuit which compares the acceleration signal outputted from the acceleration sensor with the first threshold value sent out from the first threshold value transmission circuit, and which outputs a first threshold value reaching signal when the acceleration signal has reached the first threshold value;

a second threshold value comparison circuit which compares the acceleration signal outputted from the acceleration sensor with the second threshold value sent out from the second threshold value transmission circuit, and which outputs a second threshold value reaching signal when the acceleration signal has reached the second threshold value;

a time measurement circuit which measures a time period from a point of time in which the acceleration signal, generated at an initial stage of the collision by the acceleration sensor has reached the first threshold value to a point of time in which the acceleration signal, having reached the first threshold value, reaches the second threshold value, according to the first threshold value reaching signal outputted from the first threshold value comparison circuit and the second threshold value reaching signal outputted from the second threshold value comparison circuit; and a judgment circuit which compares preliminarily the time period measured by the time measurement circuit with a previously set time before the actual deployment of an airbag, capable of differentiating a degree of acceleration generated at the initial stage of collision to judge a difference of modes of collision, which activates a plurality of inflators to fully develop an airbag when the measured time period by the timer is equal to or less than the previously set time according to the comparison, and which activates one of the inflators to partially develop the airbag when the measured time period by the timer exceeds the previously set time according to the comparison; and a structural member having high rigidity spread across the approximate whole width of the vehicle width capable of extinguishing the difference in collision area due to a difference in collision modes so that acceleration speed generated during collision to the structural member having high rigidity can be viewed as a difference in collision speed regardless of the state of collision.

6. The airbag development control apparatus according to claim 5, wherein, when the acceleration signal has exceeded the first threshold value and then once fell below the first threshold value without reaching the second threshold value, measurement is performed by setting an initial time period surpassing the first threshold value as standard, without setting a time period passing through the first threshold value during re-ascending as measurement standard.

* * * * *